Feb. 14, 1939.　　　C. S. McCARTHY　　　2,147,580
LEVER MECHANISM
Filed Feb. 1, 1938

Inventor
Charles S. McCarthy
By Braselton, Whitcomb & Davies
Attorney ent Feb. 14, 1939

2,147,580

UNITED STATES PATENT OFFICE 2,147,580

LEVER MECHANISM

Charles S. McCarthy, Toledo, Ohio, assignor to The Logan Gear Company, Toledo, Ohio, a corporation of Ohio Application February 1, 1938, Serial No. 188,115

10 Claims. (Cl. 74—535)

This invention relates to mechanism control and more especially to a lever arrangement for controlling the operation of vehicle braking mechanisms.

The invention contemplates the provision of a mechanism control particularly adapted to be mounted adjacent the cowl or dash portion of a vehicle with the lever forming a part of the mechanism arranged in depending position so as to be conveniently manipulated by the vehicle operator.

The invention embraces the provision of a lever arrangement having clutching means for holding the lever in adjusted position and embodying simple yet effective means for effecting a release of the clutching mechanism.

An object of the invention is the provision of a lever arrangement in which the lever is preferably formed of comparatively thin sheet metal into a hollow configuration to impart strength and rigidity to the structure, the arrangement incorporating a means contained within the hollow configuration of the lever for operating the clutching mechanism.

Another object of the invention resides in the provision of single spring means for not only urging the clutching means at all times toward clutching position, but exerts a force on the clutch actuating means to minimize noise which may result from vibration set up by the moving vehicle.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figure 1:
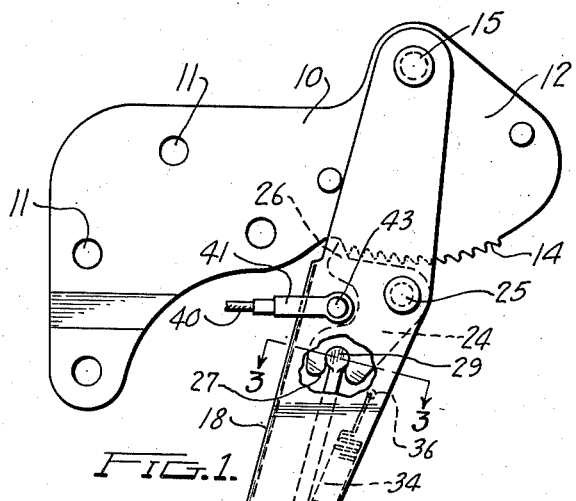
Figure 1 is a side elevational view of a mechanism control of my invention.

While the arrangement of my invention has been illustrated as having particular utility as a means of operating emergency brakes of an automotive vehicle, it is to be understood that I contemplate the use of my invention wherever the same may be found to be applicable.

Referring to the drawing in detail, there is illustrated a support or supporting element 10 having openings 11 for receiving securing means such, for example, as rivets for retaining the support to a portion of the vehicle as the cowl structure. The support 10 is provided with a vertically arranged uniplanar portion 12, a depending edge thereof having formed thereon a clutching surface, in the embodiment illustrated the clutching surface being a plurality of teeth 14.

Pivoted to the upper portion of the support 10 by means of a rivet 15 and depending from the support is a lever member 17 having a body portion 18 which terminates at its upper portion in two spaced integral walls 19 extending upon opposite sides of the uniplanar portion 12 of the support, the lever terminating at its lower extremity in an offset hand grip portion 20. The rivet 15 passes through registering openings in the parallel walls 19 and the uniplanar portion 12 of the support whereby the lever member is pivotally supported upon the support.

Figure 2:
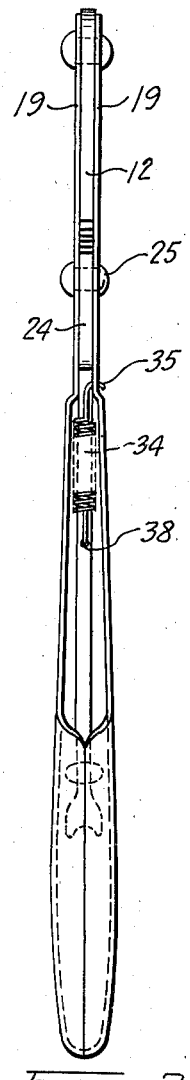
Figure 2 is a front elevational view of the control mechanism.
Figure 3:
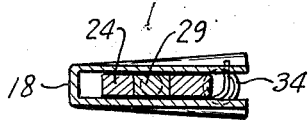
Figure 3 is a transverse sectional view taken substantially on the line 3—3 of Figure 1.

It is to be noted from examination of Figures 1, 2 and 3 that the body portion 18 of the lever is formed of channel or U-shape cross section, which section extends downwardly as far as the grip portion 20, the latter being preferably of closed hollow configuration so that the grip portion not only presents a pleasing appearance but provides a substantial gripping means which may be manipulated by the operator. The grip portion is preferably provided with indentations 22 to accommodate the fingers of the vehicle operator.

Positioned beneath the clutching surface of the portion 12 of the support is a pawl 24 which is pivotally secured to and located between the side walls of the lever member by means of a rivet 25. The upwardly projecting portion 26 of pawl 24 cooperates with the clutching surface 14 to hold the lever in adjusted position. The pawl 24 has a depending portion which is formed with a transversely arranged slot or opening, the entrance of which has a restricted throat 27. An operating means for the pawl 24 is inclusive of a rod 28 preferably of circular configuration throughout the major portion of its length and terminating at its upper extremity in a disk like cylindrical portion 29 which is received into the slot formed in the depending portion of the pawl 24, the cylindrical portion 29 being retained in the slot by means of the restricted throat portion 27.

Figure 4:
Figure 4 is a sectional view taken substantially on the line 4—4 of Figure 1.

The lower extremity of the rod 28 is preferably flattened and formed to a curved configuration as shown in Figure 4 and bent into a hook like portion or finger piece 30 which provides a means whereby the vehicle operator may withdraw the pawl 24 from engagement with the clutch surface 14. The rod 28 passes through an opening in a wall in the lever adjacent the grip portion, the rod being surrounded by a suitable grommet 32 retained in the opening in the lever wall which serves to prevent the rod 28 from direct metallic contact with the lever. The grommet being of non-metallic material as, for example, rubber, provides an anti-rattle means between the pawl operating rod and the lever. The pawl 24 is at all times urged into engagement with the clutching surface 14 by means of a contractile coil spring 34 having at one end a hook portion 35 engaging in an opening 36 in a side wall of the lever body, the other extremity of the spring being formed into a hook portion 37 passing through an opening 38 formed in the pawl operating rod 28, the spring thus exerting an upward pressure upon the pawl rod 28 and through its connection with the pawl urges the latter at all times into engagement with the clutch or toothed surface 14.

In the arrangement illustrated, the braking mechanism may be connected to the lever by means of a flexible cable 40 which is connected to a clevis 41 adapted to straddle the rear portion of the lever and pivotally connected thereto by means of a pin 43. It is to be noted that the lever arrangement of my invention is of the second order of levers with the fulcrum arranged at the upper end, the load intermediate the fulcrum and the force or power exerted by the vehicle operator upon the handle portion 20 of the lever.

In operating the mechanism the operator grasps the grip portion 20 and moves the lever about its pivot 15 in a counter-clockwise direction, the pawl 24 engaging a toothed clutch surface 14 to hold the lever and the braking mechanism in adjusted position. When it is desired to effect a release of the mechanism the operator grasping the lever 20 also simultaneously exerts a downward pressure upon the pawl rod 28 by means of the finger hook-like portion 30 which operates to withdraw the pawl from engagement with the clutching surface against the pressure of the spring 34 and in this manner effect a release of the lever.

It is apparent that, within the scope of the invention, modifications and different arrangements may be made other than is herein disclosed, and the present disclosure is illustrative merely, the invention comprehending all variations thereof.

What I claim is:

1. In combination, mechanism control including a support having a clutching surface upon a depending edge thereof; a lever formed of sheet metal having portions straddling said support and pivotally connected thereto, said lever member having a body portion of substantially U-shaped cross section, said lever terminating at its lower extremity in an offset handle portion of hollow configuration; a clutch member carried by said lever member and adapted for engagement with said clutching surface on said support to retain the lever in adjusted position; said lever having an opening in a wall thereof adjacent the handle portion; a clutch operating rod connected to said clutch member and extending through the opening in the wall of said lever, said clutch operating rod having a manipulating portion formed at its lower extremity for releasing the clutch member from engagement with the clutching surface; spring means connecting said rod with said lever for urging said clutch member toward engagement with the clutching surface; and anti-rattle means including a bushing of non-metallic material interposed between said rod and said lever.

2. In combination, mechanism control including a support having a clutching surface upon a depending edge thereof; a lever formed of sheet metal having portions straddling said support and pivotally connected thereto, said lever member having a body portion of substantially U-shaped cross section, said lever terminating at its lower extremity in a handle portion; a pawl carried by said lever member and adapted for engagement with said clutching surface on said support to retain the lever in adjusted position; an operating rod connected to said pawl and extending through an opening in the wall of said lever, said operating rod having a manipulating portion formed at its lower extremity for releasing the pawl member from engagement with the clutching surface; and spring means connecting said rod with said lever for urging said pawl member toward engagement with the clutching surface.

3. In combination, mechanism control including a support having a clutching surface upon a depending edge thereof; a lever formed of sheet metal pivotally connected thereto, said lever terminating at its lower extremity in an offset handle portion; a pawl carried by said lever member and adapted for engagement with said clutching surface on said support to retain the lever in adjusted positions; an operating rod connected to said pawl coextensively arranged with a portion of said lever, said pawl operating rod having at its upper end an enlarged portion for connecting the same to the clutch member, said rod terminating at its lower extremity in a hook-like portion for manipulating the rod to effect a release of the clutch means.

4. In combination, mechanism control including a support having a clutching surface upon an edge thereof; a lever formed of sheet metal pivotally connected thereto, said lever terminating at its lower extremity in an offset handle portion; a clutch member carried by said lever member and adapted for engagement with said clutching surface on said support to retain the lever in adjusted position; a clutch operating rod connected to said clutch member and extending through an opening in the wall of said lever, said clutch operating rod having a manipulating portion integrally formed at its lower extremity for releasing the clutch member from engagement with the clutching surface; and spring means for urging said clutch member toward engagement with the clutching surface.

5. In combination, mechanism control including a support having a clutching surface upon an edge thereof; a lever pivotally connected thereto, said lever terminating at its lower extremity in a handle portion; a clutch member carried by said lever member and adapted for engagement with the clutching surface on said support to retain the lever in adjusted positions, said clutch member having a peripheral opening with a restricted throat; and a clutch operating rod coextensively arranged with a portion of said lever, said rod having at its upper end an enlarged portion adapted to be received into the peripheral opening formed on said clutch member for connecting the rod to the clutch member, said rod terminating at its lower extremity in a hook-like portion for manipulating the rod to effect a release of the clutch means.

6. In combination, mechanism control including a support having a clutching surface upon an edge thereof; a lever pivotally connected thereto, said lever terminating at its lower extremity in a handle portion; a clutch member carried by said lever member and adapted for engagement with the clutching surface on said support to retain the lever in adjusted positions, said clutch member formed with an opening having a restricted throat; and a clutch operating rod coextensively arranged with a portion of said lever, said rod having at its upper end an enlarged portion adapted to fit the opening formed on said clutch member for connecting the rod to the clutch member, said rod having a manipulating portion formed at its lower extremity for manipulating the rod to effect a release of the clutch means.

7. In combination, mechanism control including a support having a clutching surface upon a depending edge thereof; a lever formed of sheet metal having portions straddling said support and pivotally connected thereto, said lever member having a body portion of substantially U-shaped cross section, said lever terminating at its lower extremity in an offset handle portion of hollow configuration; a clutch member carried by said lever member and adapted for engagement with said clutching surface on said support to retain the lever in adjusted positions; an operating rod connected to said clutch member coextensively arranged with the body portion of said lever, said clutch operating rod having at its upper end an enlarged disk-like portion for connecting the same to the clutch member, said rod terminating at its lower extremity in a hook-like portion for manipulating the rod to effect a release of the clutch means.

8. In combination, mechanism control including a support having a toothed edge portion; a lever formed of sheet metal having a body portion of substantially U-shaped configuration terminating in parallel portions, the latter straddling the support and pivotally connected thereto; a pawl pivoted to the side walls of said lever member, said lever member terminating at its lower extremity in a grip portion offset from the body portion of said lever, the wall of said lever adjacent the grip portion having an opening therein; a rod having its upper end connected to said pawl and projecting through the opening in the wall of said lever, the lower extremity of said rod having a manipulating portion whereby the rod may be moved downwardly to effect a disengagement of the pawl with the toothed edge portion of said support.

9. In combination, mechanism control including a support having a clutching surface upon a depending edge thereof; a lever formed of sheet metal pivotally connected thereto, said lever member having a body portion of substantially U-shaped cross section, said lever terminating at its lower extremity in a handle portion; a clutch member carried by said lever member and adapted for engagement with said clutching surface on said support to retain the lever in adjusted position; said lever having an opening in a wall of the body portion thereof adjacent the handle portion; a clutch operating rod connected to said clutch member and extending through the opening in the wall of said lever, said clutch operating rod having a hook-like portion integrally formed at its lower extremity for releasing the clutch member from engagement with the clutching surface; spring means connecting said rod with said lever for urging said clutch member toward engagement with the clutching surface; and a bushing of non-metallic material located in said lever opening interposed between said rod and said lever.

10. In combination, mechanism control including a support having a clutching surface; a lever formed of sheet metal pivotally connected to said support, said lever depending from the support and terminating at its lower extremity in a handle portion; a clutch member carried by the lever member and adapted for engagement with the clutching surface on said support to retain the lever in adjusted position; a clutch operating rod operatively associated with the clutch member and extending substantially parallel with said lever; spring means for urging said clutch member toward engagement with the clutching surface, said clutch operating rod having a manipulating portion integrally formed at its lower extremity for effecting release of the clutch member from engagement with the clutching surface.

CHARLES S. McCARTHY.